United States Patent
Marty et al.

(10) Patent No.: US 6,910,501 B2
(45) Date of Patent: Jun. 28, 2005

(54) IN-LINE SCREENS FOR THERMOSTATIC VALVES

(75) Inventors: Garry R. Marty, Fishers, IN (US); Gerald J. McNerney, Carmel, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 257 days.

(21) Appl. No.: 10/290,860

(22) Filed: Nov. 8, 2002

(65) Prior Publication Data

US 2004/0089350 A1 May 13, 2004

(51) Int. Cl.$^7$ ............................................. E03B 7/07
(52) U.S. Cl. ..................... 137/550; 137/606; 236/12.15; 210/447; 210/454; 210/463
(58) Field of Search ................................ 137/550, 606; 210/236, 238, 418, 429, 432, 447, 454, 459, 463; 236/12.15

(56) References Cited

U.S. PATENT DOCUMENTS

| | | | | |
|---|---|---|---|---|
| 379,160 A | * | 3/1888 | Haythorn | 210/447 |
| 1,292,289 A | * | 1/1919 | Fleek | 210/447 |
| 1,352,120 A | * | 9/1920 | Du Pont | 210/454 |
| 1,613,166 A | * | 1/1927 | Gregory | 210/429 |
| 2,087,385 A | * | 7/1937 | Naujoks | 210/447 |
| 2,527,836 A | * | 10/1950 | Miller | 236/12.15 |
| 2,560,293 A | * | 7/1951 | Kempton | 137/606 |
| 2,670,900 A | * | 3/1954 | Branson | 236/12.15 |
| 2,772,833 A | * | 12/1956 | Chace | 236/12.15 |
| 3,443,693 A | * | 5/1969 | Biermann | 210/447 |

* cited by examiner

*Primary Examiner*—John Rivell
(74) *Attorney, Agent, or Firm*—Woodard, Emhardt, Moriarty, McNett & Henry LLP

(57) ABSTRACT

A thermostatic valve for mixing hot water and cold water includes a valve body defining a first inlet, a second inlet, a mixing chamber, a first passageway between the first inlet and the mixing chamber, and a second passageway between the second inlet and the mixing chamber. The thermostatic valve includes first and second flow control assemblies and first and second screen assemblies assembled into the valve body. A first screen assembly is positioned downstream of a first flow control assembly and a second screen assembly is positioned downstream of a second flow control assembly. Each screen assembly is removable from the valve body and includes a screen body having a screening portion with a lower open end and a top portion. The screen assembly includes a closing cap to retain accumulated particulate matter. A retaining clip is used to hold the screen assembly in position within the valve body.

21 Claims, 4 Drawing Sheets

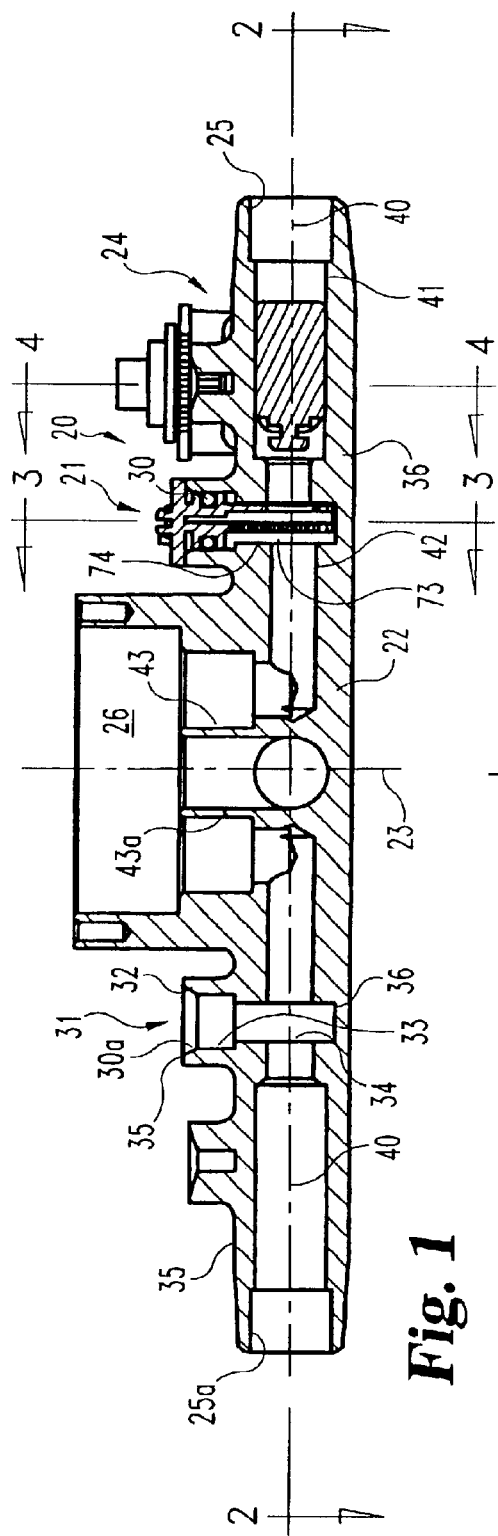
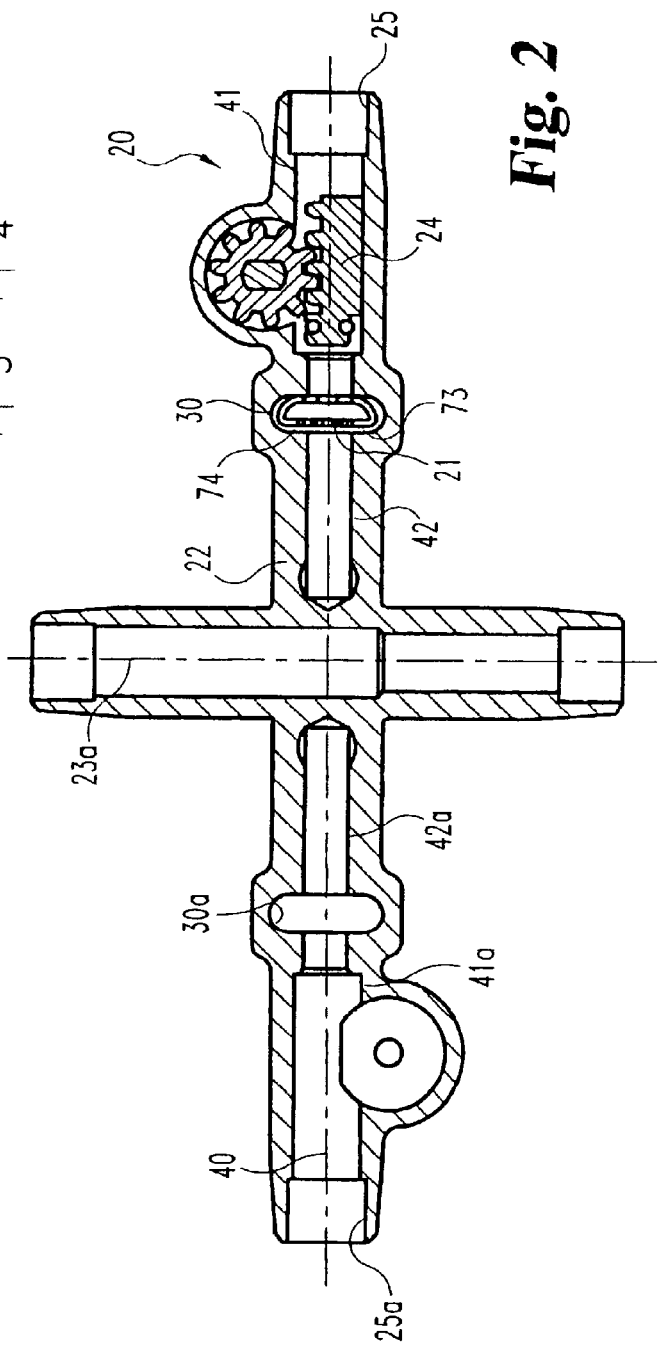

IN-LINE SCREENS FOR THERMOSTATIC VALVES

BACKGROUND OF THE INVENTION

The present invention relates in general to mesh screens and similar screening inserts and mechanisms which are used as part of a liquid control valve for separating out particulate matter from a flow of liquid, typically water, through the liquid control valve. More specifically, the present invention relates to the design of an in-line screen for a thermostatic valve, such as a thermostatically-controlled mixing valve, which would typically be used in conjunction with separate hot and cold water lines.

Single handle mixing valves are well known and common in the plumbing field. These valves provide a stream of mixed water from separate hot and cold water streams. However, these valves are subject to the inconvenience that may result from a sudden undesirable change in water temperature or pressure of the water in either of the lines supplying water to the valve. In some cases, the resulting change in the temperature of the mixed outlet water can result in discomfort to the user of the valve. The discomfort can be particularly pronounced when the valve is a shower mixing valve and the user is within the shower stall. A sudden pressure drop in the cold water line, such as that which frequently occurs when a toilet is flushed, will cause a sudden increase in the temperature of the shower water, requiring the user to move quickly away from the stream of water.

Several faucets and mixing valves have been developed in an attempt to reduce or eliminate this problem. U.S. Pat. No. 4,699,172 (issued Oct. 13, 1987 to MacDonald) provides a self-regulating valve assembly for combining pressurized hot and cold water to produce an output of mixed water having a preselected constant water temperature. The valve assembly comprises a housing having a valuing cavity, a hot water inlet leading to the valuing cavity, a cold water inlet leading to the valuing cavity, and a mixed water outlet passageway leading from the valuing cavity. A valve member translates in the valuing cavity and divides the cavity into two auxiliary chambers. A passageway through the valve member allows fluid to flow from each of the inlets to the outlet passageway at a rate that varies as the valve member translates. Passageways in the valve member permit a portion of the mixed water to flow into the auxiliary chambers. An auxiliary passageway is provided between each of the auxiliary chambers and the outlet passageway. A temperature responsive element is provided within the outlet passageway. In response to a deviation in the temperature of water in the mixing chamber, the temperature responsive element closes one of the auxiliary passageways, causing the valve member to translate until the water in the outlet passageway reaches the preselected temperature. U.S. Pat. No. 5,904,291 (issued May 18, 1999 to Knapp) also discloses a thermostatic faucet mixing valve which incorporates a thermostatic regulator for a single handle mixer valve which includes a sensor mounted in a mixed water chamber for sensing the temperature of the outlet water. In this case, the sensor is connected to a valve that is mounted in the cold water supply line in order to restrict the availability of cold water when the water in the hot water line is down below a set temperature.

While the present invention is described in the context of a thermostatic valve as part of a water delivery system, the specific focus of the present invention relates to an in-line screen which is used in each water line downstream from the inlet and upstream from the mixing chamber. While mesh screens are well known for water valves and faucets, one typical location is at the point of exit of the mixed stream of water, such as from a kitchen faucet where the exiting flow is aerated. Another possible location for such mesh screens is interior to the valve, such as that disclosed in U.S. Pat. No. 6,321,777 (issued Nov. 27, 2001 to Wu). In the '777 patent, a cylindrical water filter screen element (7) is positioned within the faucet body (2) between plug block (32) and water sealing washer (52).

In the context of a thermostatic valve, one location for a mesh screen would be around the cartridge. In the context of the present invention, and in the context of the prior art, the term "cartridge" is generally understood as referring to a multiple-component structure which can be handled as a single unit. This particular screen placement has been attempted and, as a result, a number of technical and performance facts have been discovered. First, in an effort to effectively separate out particulate matter from the flow of water, it has been learned that the openings in the mesh screen become plugged and, as a result, almost immediately there is a decrease in the flow rate. There obviously has to be a balance between the size of the screen mesh openings and the duration or length of use before the mesh screen has to be removed and cleaned. However, regardless of the cleaning cycle or interval, if the flow rate is decreased almost immediately as portions of the mesh screen become plugged with particulate, this is seen as a significant drawback to any such design. It would therefore be an improvement to this earlier mesh screen design and its arrangement within the valve if some significant portion of the screen could become plugged with particulate matter without any noticeable decrease in the (through) flow rate. The present invention provides such an improvement by the specific configuration of the disclosed screen and the configuration of the cooperating valve body and in particular the pocket where the disclosed screen is installed.

Another concern with the placement of a mesh screen around the cartridge is removal and replacement of the cartridge. Due to the close fit and limited clearance between the mesh screen and the exterior of the cartridge, the collection of particulate matter, as it becomes imbedded in the mesh, can make it difficult to install the cartridge. As an improvement to this earlier design and as an improvement to this issue in particular, the screen of the present invention is positioned downstream from the water inlet and the flow control mechanism in a separate portion of the valve body, without cooperating with or interfacing with any other structural portion other than the valve body pocket which receives the screen.

One issue related to the position of the mesh screen around the cartridge is that when the mesh screen is to be removed for cleaning, the cartridge must also be removed. When the cartridge is taken out of the housing body, the cooperating control handle may lose its calibration relative to the hot limit stop or setting. This is seen as a safety concern and this problem should be avoided if at all possible.

Another issue related to the arrangement of placing the mesh screen around the cartridge is the likelihood of once collected debris (i.e., separated particulate) falling off of the mesh screen and going right back into the interior of the valve body to simply be collected by the mesh screen all over again or possibly passing downstream such that it is not collected at all.

The screen of the present invention has an overall design which provides a number of features which are different from the structure of the prior mesh screen that is positioned around the cartridge. The benefits and improvements of the present invention encompass aspects of the structure of the screen as well as its placement within the surrounding valve structure, and the cooperating design of the surrounding valve structure, which in the preferred embodiment is the valve body of a thermostatic valve.

SUMMARY OF THE INVENTION

A thermostatic valve for mixing a flow of hot water and a flow of cold water for delivery from a controllable faucet according to one embodiment of the present invention comprises a valve body defining a first flow inlet, a second flow inlet, a mixing chamber, a first flow passageway extending between the first flow inlet and the mixing chamber, and a second flow passageway extending between the second flow inlet and the mixing chamber. The thermostatic valve further comprises a first flow control assembly assembled into the valve body and intersecting the first flow passageway, a second flow control assembly assembled into the valve body and intersecting the second flow passageway, a first screen assembly positioned in the first flow passageway downstream of the first flow control assembly, and a second screen assembly positioned in the second flow passageway downstream of the second flow control assembly.

One object of the present invention is to provide an improved in-line screen for a thermostatic valve.

Related objects and advantages of the present invention will be apparent from the following description.

BRIEF DESCRIPTION OF THE DRAWINGS

FIG. 1 is a front elevational view, in full section, of a thermostatic valve (partially assembled) according to a typical embodiment of the present invention.

FIG. 2 is a top plan view, in full section, of the FIG. 1 thermostatic valve.

DESCRIPTION OF THE PREFERRED EMBODIMENT

Figure 3:
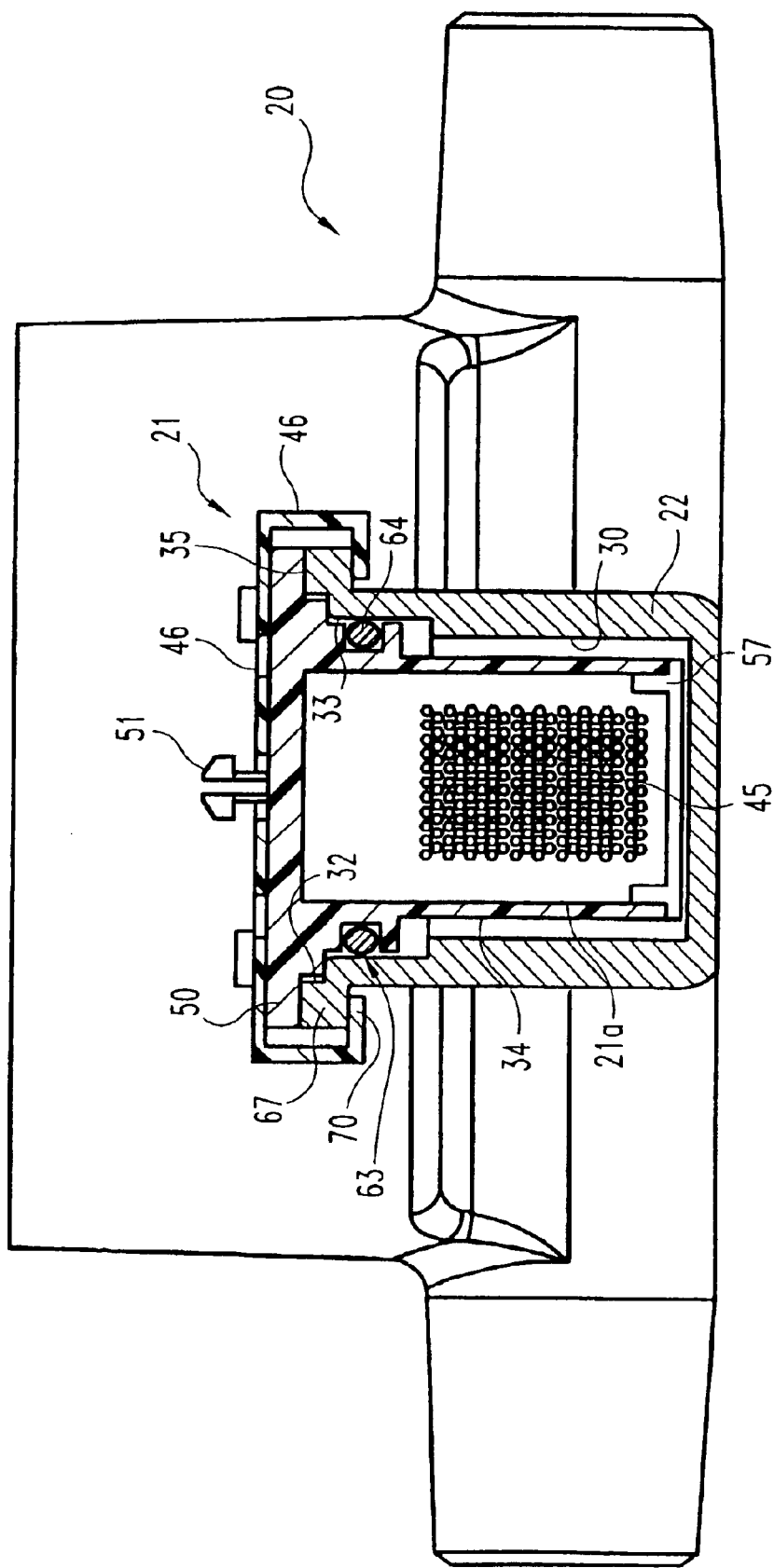
FIG. 3 is an enlarged end elevational view, in full section, of the FIG. 1 thermostatic valve as viewed along line 3—3 in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1 and 2, there is partially illustrated a thermostatic valve 20 for a liquid delivery system, preferably a manually-controlled water valve. Since the focus of the present invention is directed to the addition of in-line screen assembly 21 as well as its specific construction, some of the components which would typically be assembled into or onto valve body 22 in order to complete the assembly of thermostatic valve 20 have been omitted from the FIGS. 1 and 2 illustrations. Due to what is currently known with regard to thermostatic valves in terms of their construction and use and in view of what is illustrated and described herein, the details of the present invention are fully and completely disclosed such that an individual of ordinary skill in this art would be enabled to make and use the claimed invention.

Figure 4:
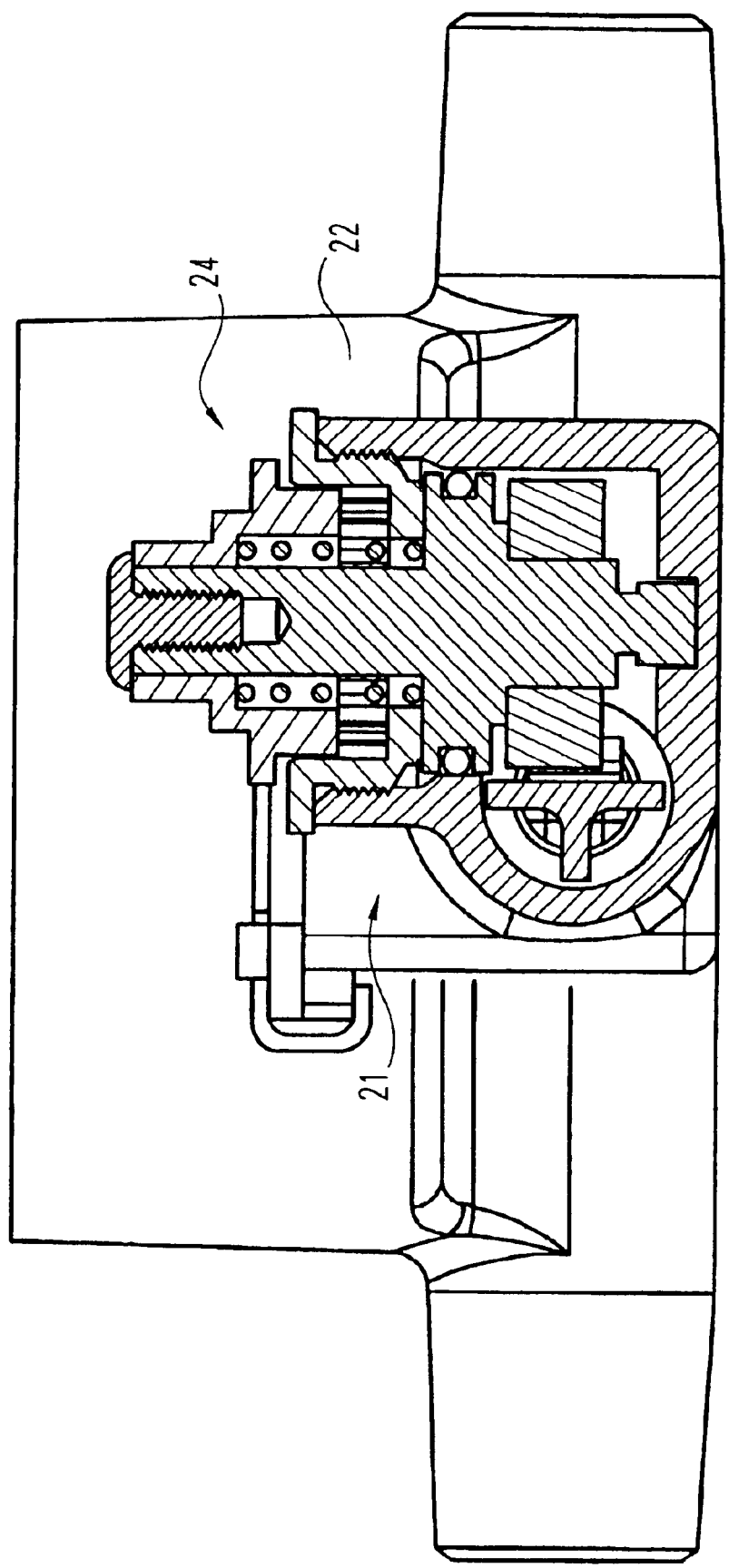
FIG. 4 is an enlarged end elevational view, in full section, of the FIG. 1 thermostatic valve as viewed along line 4—4 in FIG. 1.

As illustrated, FIG. 1 is a full section view of the thermostatic valve 20, which is only partially assembled. The various geometric sectioning or viewing planes for FIGS. 2, 3, and 4 are included. However, the actual drawing illustrations of FIGS. 2, 3, and 4 are full views, i.e., the sectioned away portions of FIG. 1 are effectively added back for the structural completeness of FIGS. 2, 3, and 4.

The valve body 22 defines a generally symmetrical design relative to intersecting centerlines 23 and 23a with one flow-control assembly 24 on one side and a virtually identical flow-control assembly on the opposite side, though not illustrated. Nevertheless, the structural provisions for the second flow-control assembly are illustrated as part of valve body 22 and it should be clear that the design symmetry for thermostatic valve 20 would employ virtually identical flow-control assemblies structured, positioned, and assembled in a virtually identical fashion on opposite sides of centerlines 23 and 23a. The details of the one illustrated flow-control assembly 24 are provided in the full section views, across different cutting planes, represented by drawing FIGS. 1, 2 and 4. Each flow control assembly 24 is constructed and arranged to control the flow of water from its corresponding inlet 25 (or 25a). One flow-control assembly 24 is used for the delivery of cold water to mixing chamber 26 and the other flow-control assembly (not illustrated) is used for the delivery of hot water to the mixing chamber.

Valve body 22 is a unitary casting which is constructed and arranged with two screen compartments 30 and 30a, each of which is located in-line with and downstream of a corresponding one of the flow-control assemblies 24. Keeping with the hot side and cold side design symmetry of thermostatic valve 20 and valve body 22, relative to centerlines 23 and 23a, the screen compartments 30 and 30a are configured and positioned in a virtually identical manner within valve body 22. Each screen compartment 30 and 30a defines a oblong aperture 31 configured with three sequential (axial) sections, including an upper chamfered section 32, a middle section 33, and a lower section 34. Oblong aperture 31 is a blind aperture extending from upper surface 35 of valve body 22 downwardly into lower wall portion 36.

Each flow inlet 25 and 25a is a generally cylindrical aperture which is concentric about longitudinal centerline 40. Each flow inlet 25 and 25a longitudinally extends into a corresponding generally cylindrical flow control section 41 (and 41a) which in turn longitudinally extends into a corresponding generally cylindrical flow passageway 42 (and 42a). Each flow passageway 42 and 42a is in flow connection with mixing chamber 26 by way of a corresponding passageway 43 and 43a, respectively. As should be understood, the combination of flow control section 41, flow passageway 42, and passageway 43 creates a common passageway leading from flow inlet 25 to mixing chamber 26. Similarly, flow control section 41a in combination with flow passageway 42a and passageway 43a create a common passageway leading from flow inlet 25a to mixing chamber 26. It should also be understood that one of the flow-control assemblies 24 is assembled into valve body 22 such that it intersects this first flow passageway which is the combination of the three portions already mentioned. The screen assembly is also positioned in this first flow passageway at a point downstream from the first flow control assembly 24. A virtually identical and symmetrical structure exists on the opposite side of centerlines 23 and 23a.

Inlet 25 and flow control section 41 and flow passageway 42 are concentric to each other and concentric about centerline 40. The diameter size of each flow section gradually decreases from inlet 25 to section 41 to section 42. In a similar and symmetrical fashion, inlet 25a, flow control section 41a, and flow passageway 42a are concentric to each other and concentric about centerline 40. The diameter size of each flow section gradually decreases from inlet 25a to section 41a to passageway 42a.

Assembled into each screen compartment 30 (or 30a) by insertion into oblong (blind) aperture 31 is a corresponding in-line screen assembly 21 which is constructed and arranged to accept a flow of water and to screen that flow so as to separate out particulate matter. The position for in-line screen assembly 21 is between inlet 25 (or 25a) and mixing chamber 26 at a location which is downstream from flow-control assembly 24. As will be described, each screen assembly 21 includes a unitary screen body 21a, an O-ring 64, a closing cap 57 (see FIGS. 3 and 6), and a retaining clip 46. The retaining clip 46 is removable from the screen body 21a and can be added after the screen body 21a is inserted into its corresponding screen compartment 30 (or 30a). Accordingly, each reference herein to the screen assembly 21 is intended to include the screen body 21a with or without the retaining clip 46. Additionally, the closing cap 57 could conceivably be replaced with an integral bottom wall. Accordingly, each reference herein to the screen assembly is intended to include either the closing cap 57 or an integral bottom wall. This bottom wall could either be solid, perforate or mesh, so long as the openings would be sufficiently small to capture any particulate matter of a size which should not pass downstream to the mixing chamber 26. Closing cap 57 includes attachment clips 57a which are constructed and arranged to assemble into apertures 45a.

In lieu of using retaining clip 46, it is contemplated that the screen assembly 21 will be affixed directly to the valve body 22 by the use of threaded fasteners. The preferred fastener location is through top 50 into tab 67. Preferably, the tab 67 is internally threaded or includes a plurality of threaded inserts for receipt of the corresponding threaded fasteners.

Each in-line screen assembly 21 is constructed and arranged to securely fit within its oblong aperture 31 and to seal up against the wall of the corresponding screen compartment 30 (or 30a) such that the primary screening portion 45 extends completely across flow passageway 42 (or 42a). In this way, the incoming flow of water from each inlet 25 and 25a is screened for particulate matter by the corresponding screen assembly 21 before reaching the mixing chamber 26. The screen assembly 21 is held in position in oblong aperture 31 by a pivotable retaining clip 46 which extends across the top of the screen assembly 21 and fits onto a cooperating portion of the valve body 22.

Referring to FIG. 3, the assembly of one screen assembly 21 into its oblong aperture 31 is illustrated with the water flow direction through flow passageway 42 (or 42a) being perpendicular to the plane of the page. FIG. 4 helps to illustrate the location of the screen assembly 21 relative to the corresponding and upstream flow-control assembly 24 and the construction of each flow-control assembly 24. Since the FIGS. 3 and 4 illustrations are sectioned drawings, added reference to FIGS. 5 and 6 should facilitate a complete understanding of the design and construction of screen body 21a.

Figure 5:
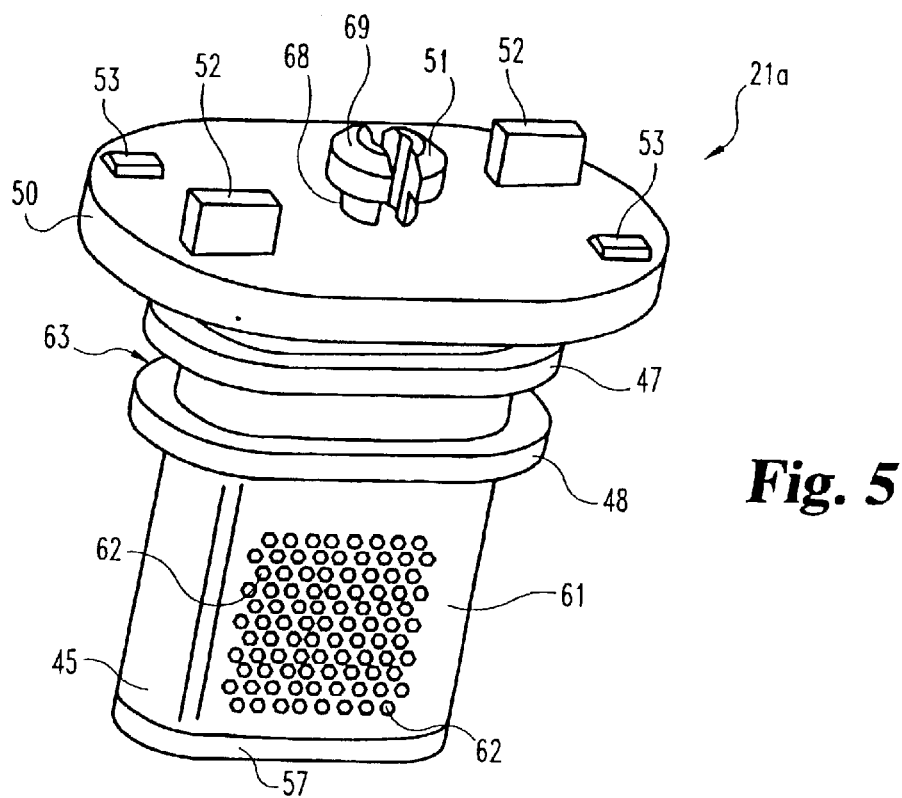
FIG. 5 is an enlarged perspective view of a screen according to a typical embodiment of the present invention and providing one of the components to be assembled into the FIG. 1 thermostatic valve.
Figure 6:
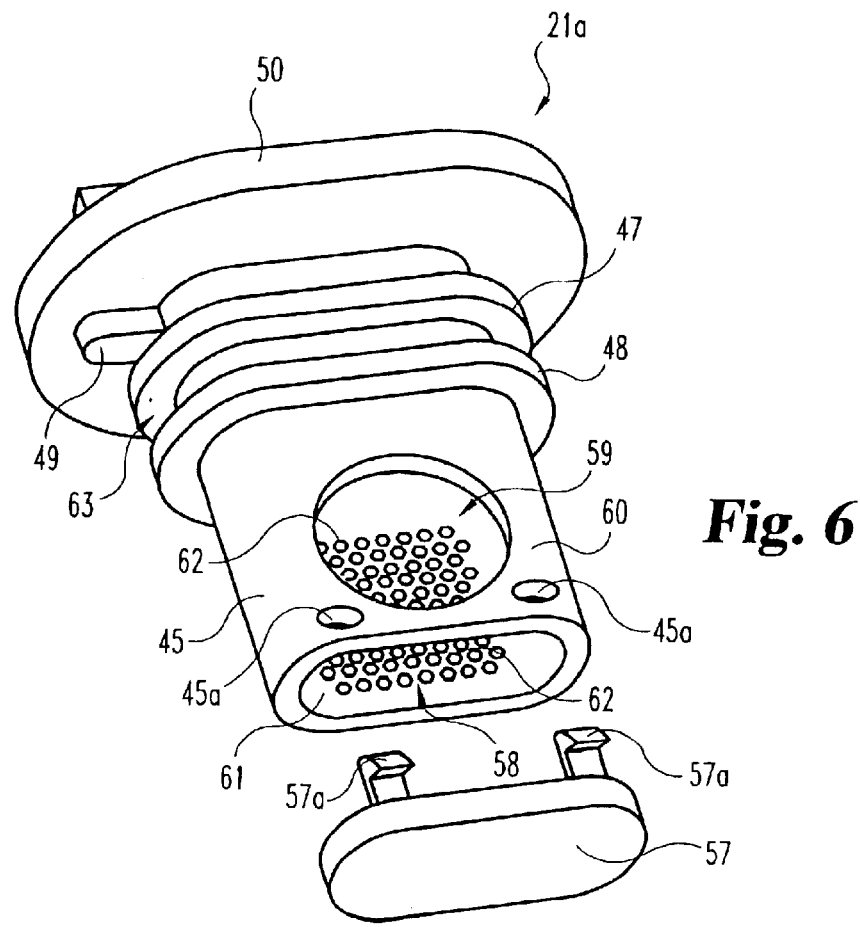
FIG. 6 is an enlarged, exploded perspective view of the FIG. 5 screen and its closing cap.

With continued reference to FIGS. 5 and 6, screen body 21a includes, in addition to primary screening portion 45, spaced sealing groove flanges 47 and 48, interfit tab 49, top 50, pivot post 51, raised ribs 52, and raised tabs 53. A snap-on (or snap-in) closing cap 57 (see FIG. 3) is assembled into the lower open end 58 of screening portion 45 of screen body 21a to help create screen assembly 21. Alternatively, the lower open end can be integrally closed by a unitary bottom wall configured as part of screening portion 45. Screening portion 45 includes and defines a large flow opening 59 in the front face 60 which is directed upstream toward the incoming flow. The opposite side 61 of screening portion 45 includes and defines a uniformly-spaced pattern of screening apertures 62 which are designed to screen out particulate matter from the incoming flow of water through flow opening 59.

The oblong shapes of screening portion 45, flanges 47 and 48, and top 50 are compatible with the oblong shapes (in lateral section) of oblong aperture 31. The peripheral size of each section 45, 47, 48, and 50 also generally coincide with the three oblong sections 34, 33, and 32 of oblong aperture 31. As will be described hereinafter, there is a designed clearance space 73 between the lower oblong section 34 and side 61 of screening portion 45 in order to permit and facilitate a full flow rate even as particulate matter begins to accumulate in screen assembly 21.

Referring to FIG. 3, the fit and assembly of screen assembly 21 into the screen compartment 30 of valve body 22 is illustrated. Included in this assembly illustration is the pivotable retaining clip 46 and the closing cap 57 which in combination with the O-ring 64 completes the screen assembly 21. The spaced-apart flanges 47 and 48 define a sealing groove 63 for receipt of the sealing O-ring 64 which is sized to be retained in groove 63 and to compress up against the interior wall surface of middle section 33 of oblong aperture 31.

As will be understood by reference to FIGS. 1–6, the oblong top 50 rests on the upper surface 35 of the valve body 22, surrounding the oblong aperture 31. The shaping and contouring of the valve body 22 in this location provides a lip portion or tab 67 for receiving the retaining clip 46. This pivotable retaining clip 46 is a generally rectangular member with a centered clearance hole for receiving pivot post 51 with a snap-over assembly. The pivot post 51 is a split design with an undercut portion 68 below the enlarged head 69. With this construction and assembly, the retaining clip 46 is able to pivot between a release orientation and a locking or secured orientation relative to the status of screen assembly 21. In the release condition, the underside lip 70 of retaining clip 46 is pivoted out of engagement with tab 67. In this orientation, the screen assembly 21 is able to be pulled out of the oblong aperture 31. When the lip 70 is secured beneath tab 67, the screen assembly 21 is retained in the oblong aperture 31.

The raised ribs 52 function as abutment stops to prevent over rotation of retaining clip 46. The two raised ribs 52 can also be used to grasp and pull out the screen assembly 21 from the oblong aperture 31. The raised tabs 53 provide a tactile feel whenever the retaining clip 46 is assembled or disassembled. The snap-on (or snap-in) closing cap 57 functions to trap and retain whatever particulate matter is screened out by apertures 62. While some particles may imbed themselves in the apertures 62, a majority of the screened out particulate matter simply falls down onto the inner surface of the closing cap 57 and accumulates inside screening portion 45. In order to clean screen assembly 21 and empty or remove any accumulated particulate matter, the retaining clip 46 is pivoted to unhook it from the valve body tab 67. Next, the raised ribs 52 are grasped and the entire screen assembly 21, including closing cap 57, is pulled out of the valve body. Once the screen assembly 21 is removed, the particulate matter is able to be cleaned away and the screen assembly 21 is then reinstalled into the valve body. The general shape of screen assembly 21 relative to oblong aperture 31 would allow the screen assembly 21 to be installed with flow opening 57 facing upstream, which is the proper orientation, or facing downstream, which is not acceptable. In order to guarantee that the screen assembly is properly installed, a small recess is provided in the upper surface 35 of valve body 22 which is constructed and arranged to receive interfit tab 49. Until interfit tab 49 is properly seated in the recess, the screen assembly cannot be fully and properly installed into the valve body. In this way, the proper orientation for the screen assembly 21 relative to the valve body is guaranteed.

One further feature of the present invention relates to the downstream clearance space 73 between the opposite side 61 of screening portion 45 and the adjacent wall 74 (see FIGS. 1 and 2) of the valve body that helps define oblong aperture 31. By providing this clearance space 73, the incoming flow of water is able to re-route its path over or around the initially accumulated particulate matter within screening portion 45 so as to flow into the downstream portion of passageway 42 and from there into passageway 43. The cross sectional flow area of passageway 42 is not initially reduced by the accumulation of particulate matter within screen assembly 21 for this reason. Only after approximately thirty percent (30%) of the surface area of screening apertures 62 are plugged or otherwise covered by particulate matter is there any noticeable reduction in the flow rate of the water delivered to the mixing chamber 26 by way of passageway 43 (or 43a).

Considering the overall application, water temperatures, cyclic use, and the need for periodic removal and cleaning of the screen assembly 21, the suitable materials for screen body 21a and closing cap 57 include plastics such as acetal, nylon or PBT.

Suitable materials for the retaining clip 46 include stainless steel or brass. The preferred material for the O-ring 64 is nitrile or EPDM.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thermostatic valve for mixing a flow of hot water and a flow of cold water for delivery from a controllable faucet, said thermostatic valve comprising:

a valve body defining a first flow inlet, a second flow inlet, a mixing chamber, a first flow passageway extending between said first flow inlet and said mixing chambers and a second flow passageway extending between said second flow inlet and said mixing chamber;

a first flow control assembly assembled into said valve body and intersecting said first flow passageway;

a second flow control assembly assembled into said valve body and intersecting said second flow passageway;

a first screen assembly positioned in said first flow passageway downstream of said first flow control assembly, said first screen assembly being positioned in a first screen compartment defined by said valve body, said first screen compartment being located in a portion of said valve body that is structurally separate from said first flow control assembly; and a second screen assembly positioned in said second flow passageway downstream of said second flow control assembly, said second screen assembly being positioned in a second screen compartment defined by said valve body, said second screen compartment being located in a portion of said valve body that is structurally separate from said second flow control assembly.

2. The thermostatic valve of claim 1 wherein said first screen assembly being removably assembled into said first screen compartment.

3. The thermostatic valve of claim 2 wherein said second screen assembly being removably assembled into said second screen compartment.

4. The thermostatic valve of claim 3 wherein said first screen compartment being defined in part by an upstream wall and spaced therefrom a downstream wall and said first screen assembly being spaced apart from said downstream wall when assembled into said first screen compartment.

5. The thermostatic valve of claim 4 wherein said second screen compartment being defined in part by an upstream wall and spaced therefrom a downstream wall and said second screen assembly being spaced apart from said downstream wall when assembled into said second screen compartment.

6. The thermostatic valve of claim 5 wherein said first screen assembly includes a first retaining clip which is constructed and arranged to engage a portion of said valve body to secure said first screen assembly into said first screen compartment.

7. The thermostatic valve of claim 6 wherein said second screen assembly includes a second retaining clip which is constructed and arranged to engage a portion of said valve body to secure said second screen assembly into said second screen compartment.

8. The thermostatic valve of claim 2 wherein said first screen compartment being defined in part by an upstream wall and spaced therefrom a downstream wall and said first screen assembly being spaced apart from said downstream wall when assembled into said first screen compartment.

9. The thermostatic valve of claim 8 wherein said first screen assembly includes a first retaining clip which is constructed and arranged to engage a portion of said valve body to secure said first screen assembly into said first screen compartment.

10. The thermostatic valve of claim 1 wherein said first screen assembly includes a first retaining clip which is constructed and arranged to engage a portion of said valve body to secure said first screen assembly into said valve body.

11. The thermostatic valve of claim 1 wherein each screen assembly includes a screen body defining a lower open end and a closing cap assembled to said screen body to close said lower open end.

12. The thermostatic valve of claim 11 wherein each screen body includes an upstream flow opening and a plurality of screen apertures downstream of said flow opening.

13. The thermostatic valve of claim 12 wherein each screen assembly further includes a retaining clip which is constructed and arranged to engage a portion of said valve body to secure the corresponding screen assembly into said valve body.

14. The thermostatic valve of claim 13 wherein said valve body defines a corresponding screen assembly compartment for receipt of each screen assembly, each screen assembly compartment defining an upper opening for assembly and removal of the corresponding screen assembly.

15. In combination:
   a fluid control valve including a valve body and a flow control assembly assembled into said valve body; and
   a removable screen assembly constructed and arranged to assemble into said valve body for screening out particulate matter, said removable screen assembly being located downstream from said flow control assembly and including a screen body including a screening portion having a lower open end and a top; and
   a removable closing cap disposed across said lower open end to close said lower open end.

16. The removable screen assembly of claim 15 wherein said screening portion further includes an upstream flow opening and a downstream plurality of screen apertures.

17. The removable screen assembly of claim 16 wherein said screen body further includes a pivot post and said screen assembly further includes a retaining clip assembled onto said pivot post.

18. The removable screen assembly of claim 17 wherein said screen body further includes an O-ring groove and said screen assembly further includes an O-ring assembled into said O-ring groove.

19. The removable screen assembly of claim 15 wherein said screen body further includes a pivot post and said screen assembly further includes a retaining clip assembled onto said pivot post.

20. The removable screen assembly of claim 15 wherein said screen body further includes an O-ring groove and said screen assembly further includes an O-ring assembled into said O-ring groove.

21. In combination:
   a water delivery valve including a valve body;
   a removable screen assembly constructed and arranged to be insertable into said valve body, said removable screen assembly including a top for closing one end of said removable screen assembly, said top having a pivot post; and
   a pivotable retaining clip assembled to onto said pivot Post of said removable screen assembly and being constructed and arranged to engage a portion of said valve body to secure said removable screen assembly in position, wherein said pivotable retaining clip being movable to a release position, allowing removal of said removable screen assembly.

* * * * *